US 11,923,754 B2

(12) United States Patent
Jackson et al.

(10) Patent No.: US 11,923,754 B2
(45) Date of Patent: Mar. 5, 2024

(54) METHODS AND SYSTEMS FOR OIL COOLED ROTOR LAMINATIONS

(71) Applicant: Dana Belgium N.V., Flanders (BE)

(72) Inventors: Shawn P. A. Jackson, Ghent (BE); Steven Vanhee, Hooglede (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/156,252

(22) Filed: Jan. 18, 2023

(65) Prior Publication Data

US 2023/0155452 A1 May 18, 2023

Related U.S. Application Data

(62) Division of application No. 16/870,656, filed on May 8, 2020, now Pat. No. 11,626,776.

(51) Int. Cl.
*H02K 9/19* (2006.01)
*H02K 5/00* (2006.01)
*H02K 7/00* (2006.01)
*H02K 11/21* (2016.01)

(52) U.S. Cl.
CPC ............ *H02K 9/19* (2013.01); *H02K 5/00* (2013.01); *H02K 7/003* (2013.01); *H02K 11/21* (2016.01)

(58) Field of Classification Search
CPC .. H02K 9/19; H02K 5/00; H02K 9/12; H02K 7/003; H02K 11/21
USPC .............................. 310/54, 58, 59, 60 A, 61
See application file for complete search history.

(56) References Cited

U.S. PATENT DOCUMENTS

| | | |
|---|---|---|
| 5,111,090 A | 5/1992 | Otake et al. |
| 7,508,100 B2 | 3/2009 | Foster |
| 7,816,824 B2 | 10/2010 | Jöckel |
| 8,536,756 B2 | 9/2013 | Watanabe et al. |
| 9,148,041 B2 | 9/2015 | Knoblauch |
| 10,177,631 B1 | 1/2019 | Hopkins et al. |
| 2009/0121562 A1 | 5/2009 | Yim |
| 2017/0244294 A1 | 8/2017 | Holzmueller |
| 2019/0027987 A1 | 1/2019 | Fröhlick et al. |
| 2020/0036248 A1* | 1/2020 | Krais ............... H02K 9/197 |

FOREIGN PATENT DOCUMENTS

| | | | |
|---|---|---|---|
| CN | 109565201 A | | 4/2019 |
| JP | 2011254580 A | * | 12/2011 |
| JP | 2012105487 A | | 5/2012 |
| JP | 2012235546 A | * | 11/2012 |
| JP | 2014060857 A | | 4/2014 |

* cited by examiner

*Primary Examiner* — Jose A Gonzalez Quinones
(74) *Attorney, Agent, or Firm* — McCoy Russell LLP

(57) ABSTRACT

Various methods and systems are provided for a system for cooling an electric motor that includes a rotor shaft rotatably mounted inside a motor housing, a lamination stack integrally connected to the rotor shaft, an encoder-end balance plate integrally connected to a first end of the lamination stack and a first end of the rotor shaft, an output-end balance plate integrally connected to a second end of the lamination stack and a second end of the rotor shaft, an oil supply coupled to the output-end balance plate and the rotor shaft. A closed-looped coolant pathway is formed between the transmission, the rotor shaft, the encoder-end balance plate, the lamination stack, and the output-end balance plate.

19 Claims, 6 Drawing Sheets

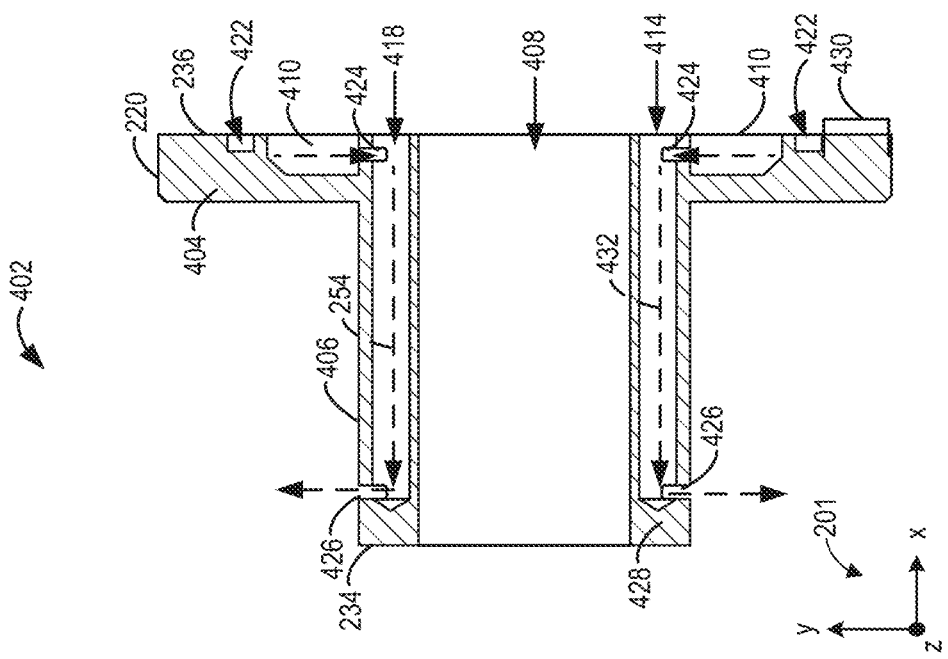
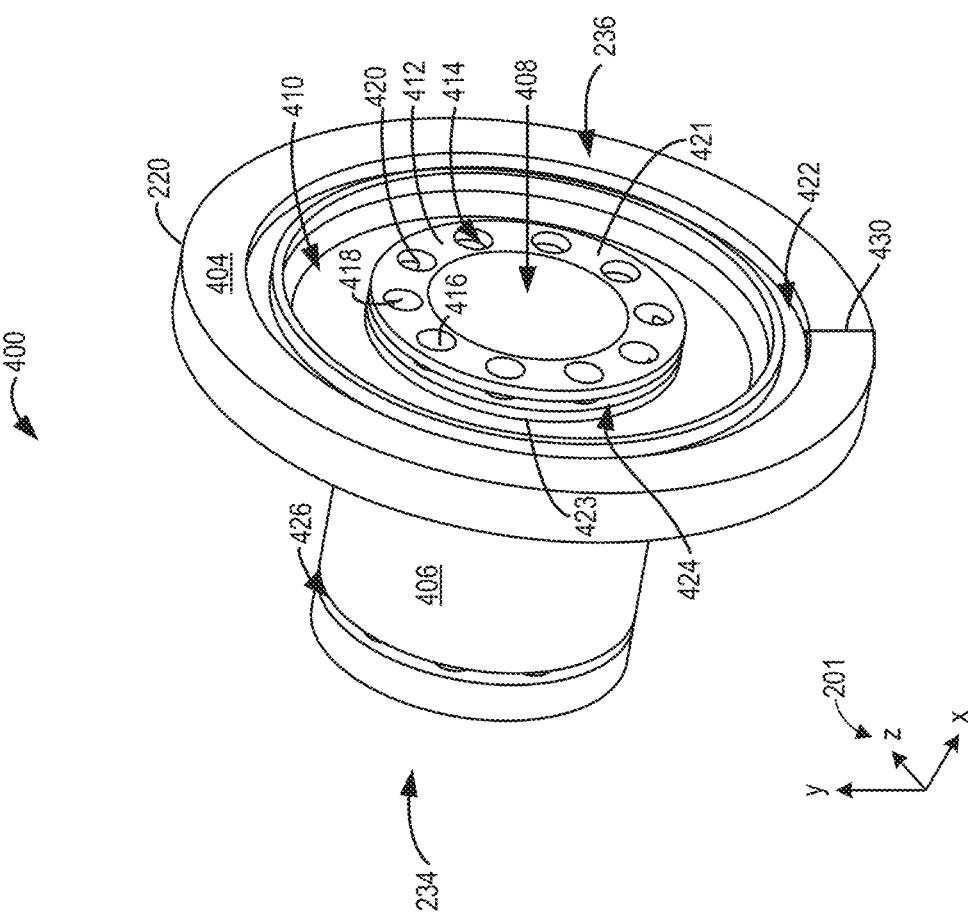
FIG. 4B
FIG. 4A

METHODS AND SYSTEMS FOR OIL COOLED ROTOR LAMINATIONS

CROSS REFERENCE TO RELATED APPLICATION

The present application is a divisional of U.S. Non-Provisional patent application Ser. No. 16/870,656, entitled "METHODS AND SYSTEMS FOR OIL COOLED ROTOR LAMINATIONS", and filed on May 8, 2020. The entire contents of the above-listed application are hereby incorporated by reference for all purposes.

FIELD

Embodiments of the subject matter disclosed herein relate to cooling electric motors, more specifically to cooling laminations of the rotor of an electric motor.

BACKGROUND

In order to achieve the desired levels of performance and reliability in an electric vehicle, the vehicle demands the temperature of the electric motor remain within its specified operating range regardless of ambient conditions or how hard the vehicle is being driven. Thus, the electric motor of the vehicle necessarily demands a cooling process. Since an air cooling system is insufficient for a motor with a power output of 15 to 20 kW or more, a water cooling system or oil cooling system is used. The oil and/or water cooling systems may be employed so that degradation of coil coatings and irreversible demagnetization of a permanent magnet are prevented to thereby increase the output range of the motor. Thus, cooling type and/or cooling efficiency are important factors in the configuration of electric motors.

BRIEF DESCRIPTION

In one embodiment, a method comprises a system for cooling an electric motor that includes a rotor shaft rotatably mounted inside a motor housing, a lamination stack integrally connected to the rotor shaft, an encoder-end balance plate integrally connected to a first end of the lamination stack and a first end of the rotor shaft, an output-end balance plate integrally connected to a second end of the lamination stack and a second end of the rotor shaft, a coolant supply (e.g., oil, water, glycol solution, etc.) coupled to the output-end balance plate and the rotor shaft. A closed-looped coolant pathway is formed between the transmission, the rotor shaft, the encoder-end balance plate, the lamination stack, and the output-end balance plate. In some examples, cooling may also be used with a standalone motor, in which the system may connect with a coolant jacket of the motor (e.g., a closed-looped coolant pathway may be formed within the coolant jacket).

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIG. 4A is a side perspective view of an output-end balance plate of the cooling system;

FIG. 4B is a cross-sectional view of the output-end balance plate of FIG. 4A.

DETAILED DESCRIPTION

Figure 1:
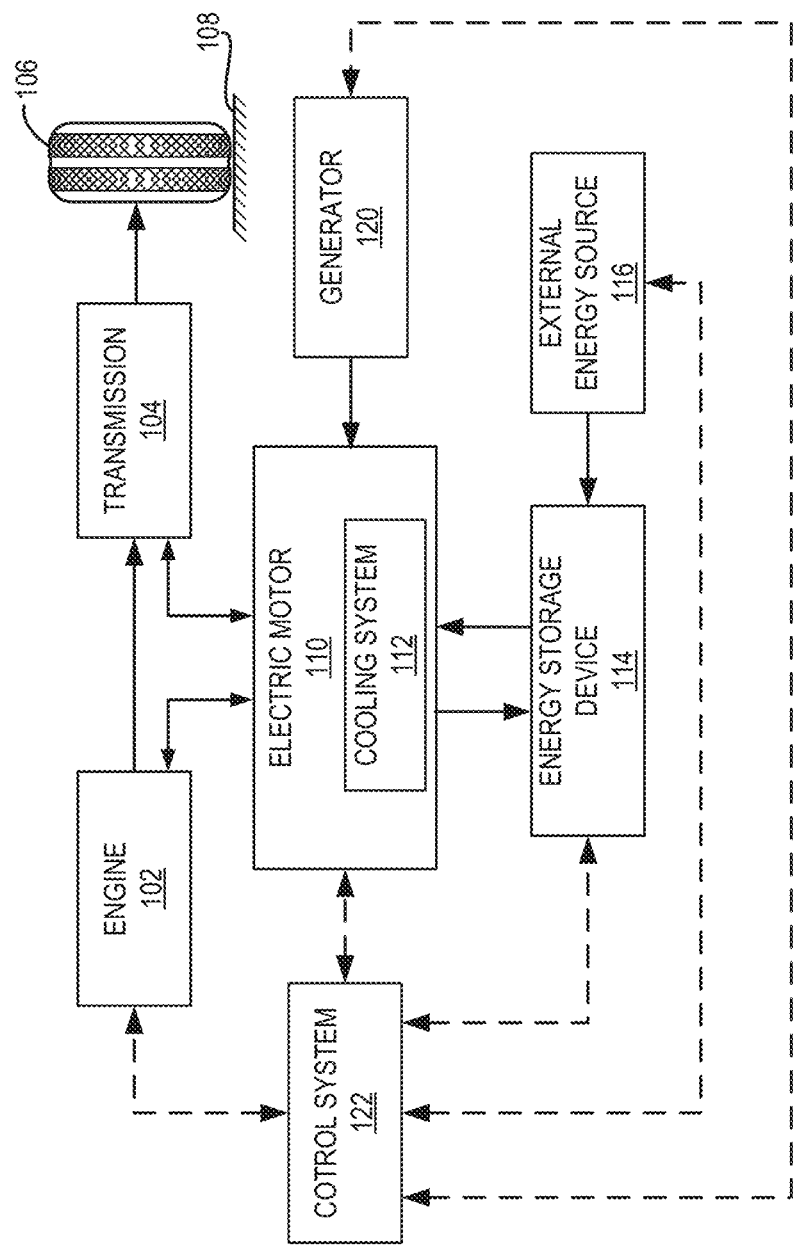
FIG. 1 schematically shows a vehicle with a hybrid propulsion system.

Electric motors generate heat as a result of electrical, magnetic, and mechanical losses, with excessive heat production often leading to motor performance issues (e.g., decreased torque production, control, efficiency) and enhanced component degradation. In electric motors used in vehicles, losses tend to be high during motor starting or dynamic braking events. Thus, thermal management for electric motors is important as the automotive industry continues to transition to more electrically dominant vehicle propulsion systems. In vehicles, the sizing of the motor depends directly on the how the motor is cooled. As such, with the push to reduce component size, lower costs, and reduce weight without sacrificing performance or reliability, the challenges associated with thermal management for electric motors increase. For example, the motor's ability to increase running time at higher power levels within electrical operating limits is directly related to the ability to remove heat from certain components. As thermal management improves, there will be a direct tradeoff among motor performance, efficiency, cost, and the sizing of electric motors to operate within the thermal constraints.

The heat generated by the electric motor is distributed throughout multiple components within the electric motor. For example, heat may be generated within the stator slot-windings, stator end-windings, stator laminations, rotor laminations, and rotor magnets or conductors. The distribution of the generated heat within the components is dependent on the motor type and the operating condition (torque/speed) of the motor. Thus, the selected cooling approach for the motor impacts the path of heat flow through the motor as well as the temperature distribution amongst the motor components. One current cooling approach involves passive air cooling in which heat generated by the motor may be conducted away from hotter components of the motor to a coupled heat sink (e.g., a mounting surface) and/or fins. Heat may then be transferred from the heat sink and/or fins to the air via convection. However, air cooling systems have been found to be insufficient if the motor has a power output of 15 to 20 kW or more. As such, the additional weight of the fins tends to outweigh the cooling benefits the fins provide. Further, the cooling capacity of air cooling systems may be affected by environmental temperatures. For example, the effectiveness of air cooling systems may be dramatically decreased in hotter climates.

Another current approach involves phase change material based cooling systems in which a phase change material absorbs heat energy from the motor by changing from a solid to a liquid or from a liquid to a gas. While changing phase, the material can absorb large amounts of heat with little change in temperature. Thus, phase change material cooling systems can meet the cooling requirements of the motor, however the volume change that occurs during a phase change restricts its application. Further, the phase change material can only absorb heat generated, not transfer the heat away, thus the phase change material may not reduce overall temperature within the vehicle propulsion system (e.g., the phase change material may only smooth the temperature distribution).

Other current cooling approaches include cooling via a liquid coolant. Liquid coolants have a higher heat conductivity and heat capacity (e.g., ability to store heat in the form of energy in its bonds) than air, and therefore perform more effectively by comparison. Further, liquid coolants offer the advantage of a compact structure as compared to phase change materials. One current liquid cooling system involves squirting or injecting an oil coolant into through-holes within the rotor shaft. Another system involves pumping the oil coolant into a first end of the rotor shaft where the coolant may be spread via centrifugal force as the rotor shaft rotates. However, these systems may lead to non-uniform or unbalanced cooling of the motor. While the cooling capacity of oil coolant may be sufficient to cool the rotor shaft, the flow properties of the oil as well as the contact resistance between the oil and the inner surface of the rotor shaft may limit the effectiveness of these forms of liquid cooling.

As such, there is a demand for an electric motor cooling system that provides uniform and effective temperature control without substantially increasing vehicle weight and manufacturing costs. Thus, according to the embodiments disclosed herein, methods and systems are provided for a system that provides uniform cooling to an electric motor. More specifically, the system cools laminations of a rotor of the electric motor using a dielectric fluid, such as oil, passed through a hollow rotor shaft as a coolant. Balance plates located on the ends of the rotor shaft may contain and direct oil (e.g., coolant) from the rotor shaft to channels within the lamination channels in a continuous cooling loop. Oil may be supplied to and absorb heat within an axial center of the rotor shaft as the oil is directed toward a first balance plate. The first balance plate may contain the oil as it exits the rotor shaft and direct the oil to the channels within the laminations using centrifugal force (e.g., from rotation of the rotor shaft). Heat may then be transferred to the oil as the oils passes over the surface area of the laminations and towards a second balance plate. The second balance plate may then direct the oil to a transmission which pumps the oil back into the rotor shaft thereby creating a continuous loop of uniform cooling within the electric motor. Additionally or alternatively, the system may include a coolant pump to contribute to/maintain oil flow through the formed cooling circuit (e.g., the system may be self-pumping and/or include the coolant pump). By bringing the oil/coolant into direct contact with the laminations, the thermal pathway between the rotor laminations and the cooling fluid is greatly reduced thereby aiding cooling performance.

Figure 2A:
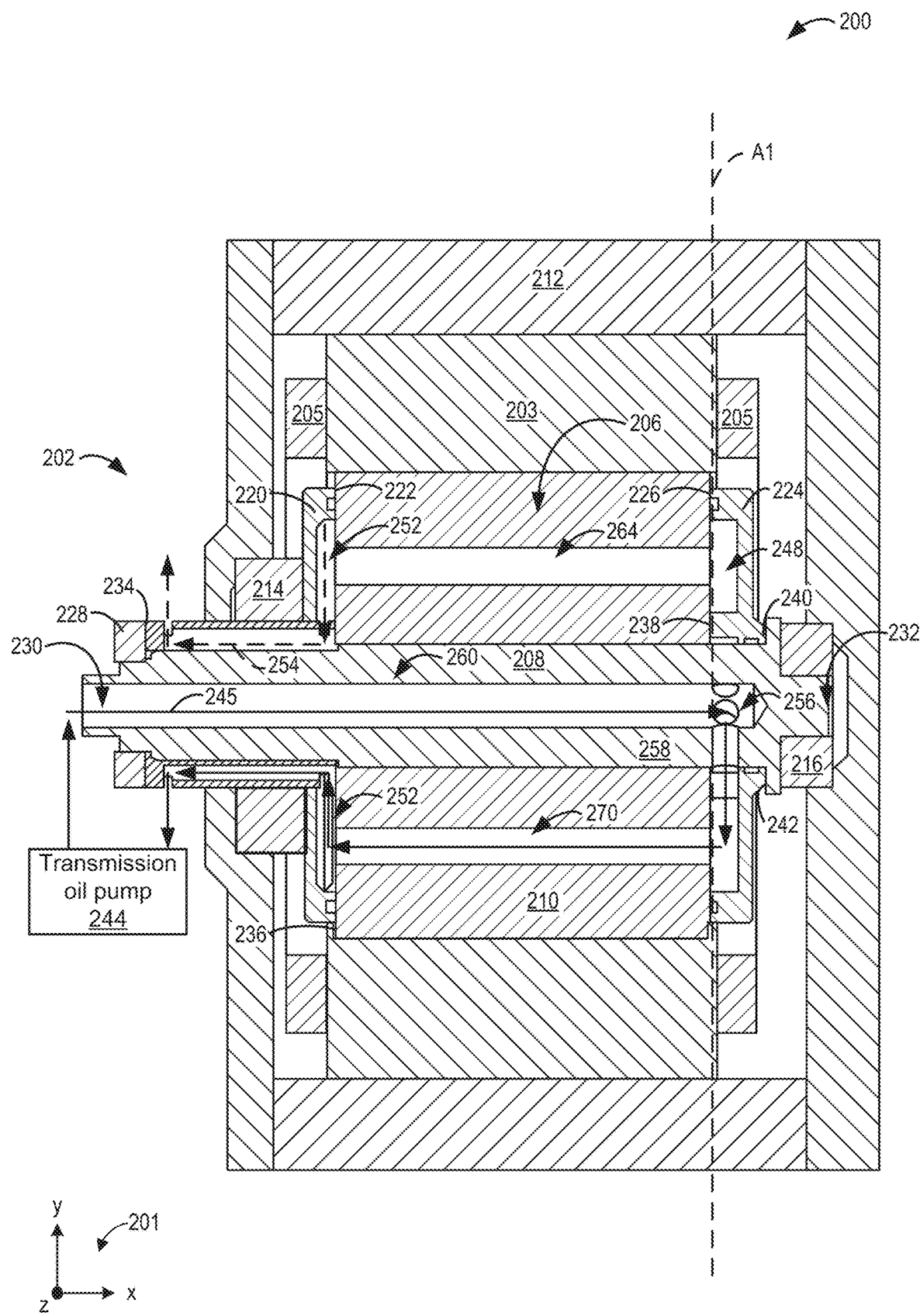
FIG. 2A is a cross-sectional view of a non-limiting example of a cooling system of an electric motor in accordance with one or more embodiments of the present disclosure.
Figure 2B:
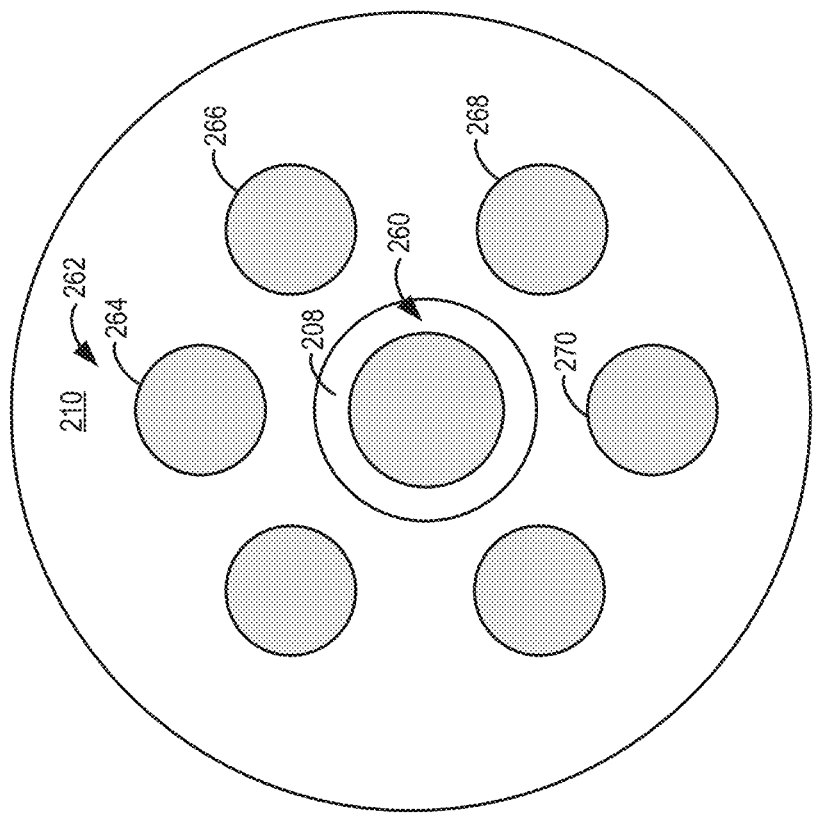
FIG. 2B is a second cross-sectional view of a rotor shaft of the electric motor of FIG. 2A.
Figure 2B:
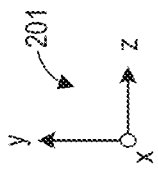
Figure 5:
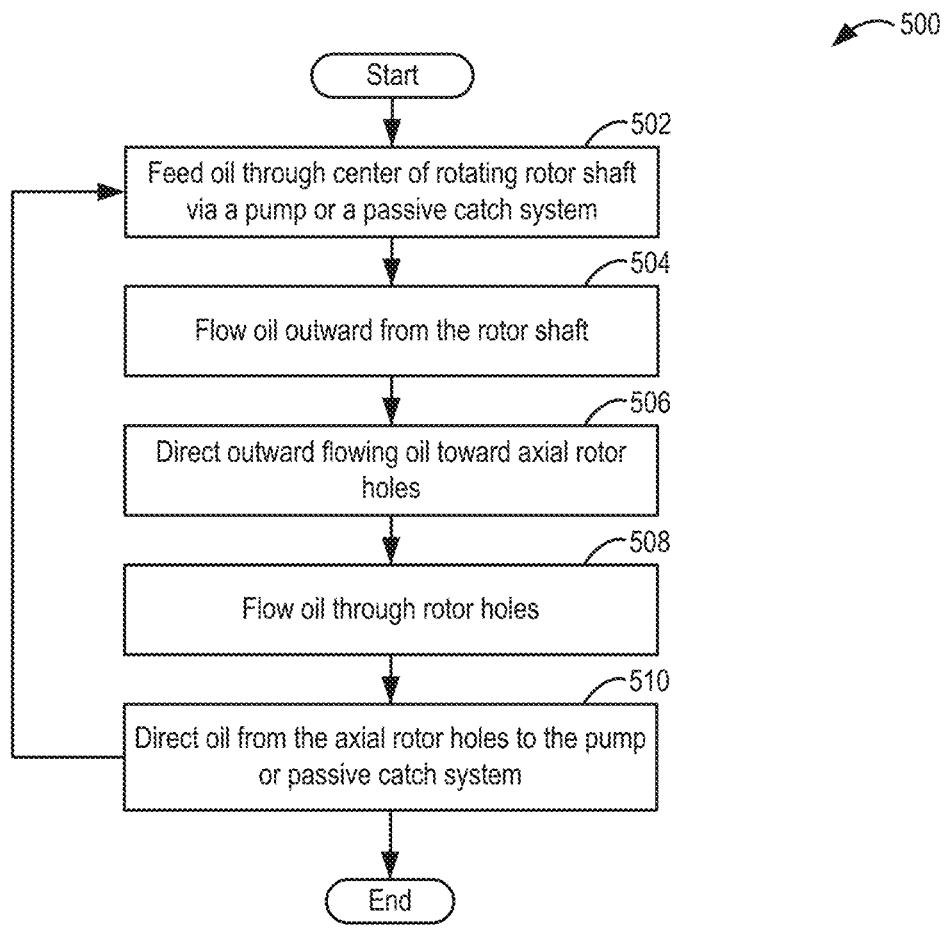
FIG. 5 is a method for cooling laminations of a rotor of an electric motor according to the embodiments of the present disclosure.

FIG. 1 is an example of a hybrid propulsion system for a vehicle that includes an electric motor. FIGS. 2A and 2B illustrate cross-sectional views of a non-limiting example of a cooling system, according to the present disclosure, that may be used to cool the electric motor of the propulsion system of FIG. 1. FIGS. 3A-4B show different views of balance plates that may be employed in the cooling system of FIGS. 2A and 2B. FIG. 5 is a method for cooling laminations of a rotor of an electric motor according to the embodiments disclosed herein. A set of reference axes 201 are provided for comparison between views shown, indicating a y-axis, a z-axis, and an x-axis. In some examples, the y-axis may be parallel with a direction of gravity, with the x-axis defining the horizontal plane.

FIG. 1 illustrates an example vehicle propulsion system 100. Vehicle propulsion system 100 includes a fuel burning engine 102 and a motor 110. As a non-limiting example, engine 102 comprises an internal combustion engine and motor 110 comprises an electric motor. Motor 110 may be configured to utilize or consume a different energy source than engine 102. For example, engine 102 may consume a liquid fuel (e.g., gasoline) to produce an engine output while motor 110 may consume electrical energy to produce a motor output. As such, a vehicle with propulsion system 100 may be referred to as a hybrid electric vehicle (HEV).

The engine 102 and motor 110 may be coupled to a transmission 104. The transmission 104 may be a manual transmission, automatic transmission, or combinations thereof. Further, various additional components may be included, such as a torque converter, and/or other gears such as a final drive unit, etc. Transmission 104 is shown coupled to a drive wheel 106 which is in contact with a road surface 108. Thus, the electric motor 110 may be drivingly coupled to the engine 102 and the drive wheel 106 via transmission 104. The depicted connections between the engine 102, motor 110, transmission 104, and drive wheel 106 indicate transmission of mechanical energy from one component to another, whereas the connections between the motor 110 and the energy storage device 114 may indicate the transmission of electrical energy forms.

Vehicle propulsion system 100 may utilize a variety of different operational modes depending on operating conditions encountered by the vehicle propulsion system 100. Some of these modes may enable engine 102 to be maintained in an off state (e.g., set to a deactivated state) where combustion of fuel at the engine is discontinued. For example, under select operating conditions, motor 110 may propel the vehicle via the drive wheel 106 while engine 102 is deactivated. During other operating conditions, engine 102 may be set to a deactivated state (as described above) while motor 110 may be operated to charge an energy storage device 114 (e.g., a battery, capacitor, flywheel, pressure vessel, so on). For example, motor 110 may receive wheel torque from the drive wheel 106 where the motor 110 may convert the kinetic energy of the vehicle to electrical energy for storage at the energy storage device 114. This operation may be referred to as regenerative braking of the vehicle. Thus, motor 110 can provide a generator function in some embodiments. However, in other embodiments, a generator 120 may instead receive wheel torque from the drive wheel 106, where the generator 120 may convert the kinetic energy of the vehicle to electrical energy for storage at the energy storage device 114.

During still other operating conditions, engine 102 may be operated by combusting fuel (e.g., gasoline, diesel, alcohol fuels, fuel blends) received from a fuel system. For example, engine 102 may be operated to propel the vehicle via the drive wheel 106 while motor 110 is deactivated. During other operating conditions, both engine 102 and motor 110 may each be operated to propel the vehicle via the drive wheel 106. A configuration where both the engine 102 and the motor 110 may selectively propel the vehicle may be referred to as a parallel type vehicle propulsion system. Note that in some embodiments, motor 110 may propel the vehicle via a first set of drive wheels and engine 102 may propel the vehicle via a second set of drive wheels.

In other embodiments, the vehicle propulsion system 100 may be configured as a series type vehicle propulsion system, whereby the engine 102 does not directly propel the drive wheel 106. Rather, engine 102 may be operated to power the motor 110, which may in turn propel the vehicle via drive wheel 106. For example, during select operating conditions, the engine 102 may drive the generator 120 which may, in turn, supply electrical energy to one or more of the motor 110 or energy storage device 114. As another example, the engine 102 may be operated to drive motor 110 which may, in turn, provide a generator function to convert the engine output to electrical energy, where the electrical energy may be stored at the energy storage device 114 for later use by the motor 110.

In some embodiments, the energy storage device 114 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 114 may include one or more batteries and/or capacitors.

A control system 122 may communicate with one or more of the engine 102, motor 110, energy storage device 114, generator 160 and/or additional components of the vehicle propulsion system 100. For example, the control system 122 may receive sensory feedback information from one or more of the engine 102, motor 110, energy storage device 114, and generator 120. Further, control system 122 may send control signals to one or more of the engine 102, motor 110, energy storage device 114, and generator 160 responsive to this sensory feedback. Control system 122 may receive an indication of an operator requested output of the vehicle propulsion system from a vehicle operator (e.g., via a pedal position sensor communicatively coupled to an acceleration and/or brake pedal).

Energy storage device 114 may periodically receive electrical energy from an external energy source 116 residing external to the vehicle (e.g., not part of the vehicle). As a non-limiting example, the vehicle propulsion system 100 may be configured as a plug-in hybrid electric vehicle (PHEV), whereby electrical energy may be supplied to the energy storage device 114 from the external energy source 116 via an electrical energy transmission cable. While the vehicle propulsion system 100 is operated to propel the vehicle, the external energy source 116 may be disconnected from the energy storage device 114. The control system 122 may identify and/or control the amount of electrical energy stored at the energy storage device, which may be referred to as the state of charge (SOC). In other embodiments, electrical energy may be received wirelessly at the energy storage device 114 from the external energy source 116. For example, energy storage device 114 may receive electrical energy from the external energy source 116 via one or more of electromagnetic induction, radio waves, and electromagnetic resonance. As such, it should be appreciated that any suitable approach may be used for recharging the energy storage device 114 from a power source that does not comprise part of the vehicle. In this way, the motor 110 may propel the vehicle by utilizing an energy source other than the fuel utilized by the engine 102.

Thus, it should be understood that the exemplary vehicle propulsion system 100 is capable of various modes of operation. In a full hybrid implementation, for example, the vehicle propulsion system 100 may operate using the motor 110 as the only torque source propelling the vehicle. This "electric only" mode of operation may be employed during braking, low speeds, while stopped at traffic lights, etc. Further, the motor 110 includes a cooling system 112 as heat may be generated as a chief by-product when the motor 110 is in use. While a hybrid implementation of the cooling system 112 is shown, the cooling system 112 for the motor 110 could also be provided in a fully electric vehicle or another suitable electric motor. In some examples, the cooling system 112 may be an air cooling system, a phase change material based cooling system, or a liquid cooling system. In some examples, the cooling system 112 may conduct heat generated by the motor 110 away from hotter components of the motor 110 (e.g., a rotor, rotor laminations) to a coupled heat sink (e.g., a mounting surface) and/or fins. In some examples, the cooling system 112 may include a phase change material (e.g., salt hydrates, metals, alloys, poly-alcohols, eutectics, paraffins). The phase change material may absorb heat energy from the motor 110 by changing state from solid to liquid. In some examples, a liquid coolant (e.g., water, an oil coolant) may be squirted onto or passed through the hotter surfaces and/or components of the motor 110. For example, the motor 110 may include a rotor that is fixed to a hollow rotating rotor shaft and a stator or lamination stack. Liquid coolant may be squirted into a through-hole or multiple through-holes within the rotor shaft to induce cooling within the motor 110 via heat transfer from the rotor shaft to the liquid coolant. In another example, a supply line may pump cooling oil into a first end of the rotating rotor shaft and the cooling oil is moved through the rotor shaft by centrifugal force thereby cooling the motor 110.

However, as previously described, air cooling systems are insufficient for cooling the motor 110 if the motor has a power output of 15 to 20 kW or more. Further, the additional weight of the fins and/or heat sinks tends to outweigh the cooling benefits they provide, particularly in hot climates. Similarly, the volume change that occurs during a phase change restricts its application in vehicles. Thus, liquid cooling systems are commonly employed in vehicles as they overcome the limitations of air and phase change material based cooling systems. However, current liquid cooling systems also have shortcomings. For instance, in the liquid cooling examples described above, cooling within the motor 110 may be unbalanced. For example, by supplying cooling oil only to the first end of the rotating rotor shaft, a second end of the rotating rotor shaft may fall outside of a desired temperature range. Similarly, squirting the liquid coolant into through-hole(s) within the rotating rotor shaft may also lead to non-uniform cooling of the electric motor 110 depending on the location of the through-hole(s), contact resistance, and the centrifugal force acting on the liquid coolant. For example, if the through-hole is inward toward a middle point of the rotating rotor shaft, at least a portion of the rotating rotor shaft may not be cooled via direct contact with the liquid coolant. Unbalanced cooling of the electric motor may lead to electrical overload, low resistance, and/or the enhanced degradation of components of the electric motor 110 (e.g., rotating rotor shaft, coil coatings).

Thus, there is a demand for uniform cooling of a high power density electric motor as provided by the cooling system presented herein.

FIG. 2A is a cross-sectional view 200 of a non-limiting example of a rotor cooling system 202 for an electric motor (e.g., electric motor 110 of FIG. 1). The cooling system 202 may include an oil supply (e.g., a transmission oil reservoir), an oil pump (e.g., a transmission oil pump 244, as further described below), and a plurality of interconnected passages within the electric motor. The plurality of interconnected passages may form a closed-loop pathway between an output-end balance plate (e.g., output-end balance plate 220, as further described below), a rotor (e.g., rotor 206, as further described below), and an encoder-end balance plate (e.g., encoder-end balance plate 224, as further described below).

The cooling system 202 may flow oil from the oil supply through the closed-loop pathway, the closed-loop pathway including an interior passageway of a rotor shaft (e.g., rotor shaft 208, as further described below), one or more passages and/or recesses of the encoder-end balance plate, one or more weight-reduction channels of a rotor lamination stack (e.g., lamination stack 210, as further described below), and one or more passages and/or recesses of the output-end balance plate. The oil may be pumped from the oil supply into the interior passageway of the rotor shaft. The oil may then flow from the rotor shaft to the one or more passages and/or recesses of the encoder-end balance plate (via centrifugal force and/or pumping), from the one or more passages and/or recesses of the encoder-end balance plate to one or more weight-reduction channels of the lamination stack, from the one or more weight-reduction channels of the lamination stack to one or more passages and/or recesses of the output-end balance plate, and from the one or more passages and/or recesses of the output-end balance back to the oil supply23. As the oil passes through the closed-loop pathway, heat generated via electric motor use may be transferred to the oil thereby cooling the electric motor.

If the cooling system 202 is suitably sized, the system 202 may be self-pumping (e.g., if the outlet of the rotor cooling circuit is radially more outlet to the inlet, centrifugal forces may enforce an oil flow). In some examples, the system 202 may be driven and/or assisted by an external pump. In some examples, the cooling system 202 may include a liquid coolant supply instead of the oil supply, with liquid coolant pumped through the closed-loop pathway to induce cooling of the electric motor (e.g., water glycol solution may be passed through the inner surface of axial holes lined with a dielectric liner).

The electric motor may generally include a stator 203, stator windings 205, and a rotor 206, the rotor 206 comprising a hollow rotor shaft 208 and a lamination stack 210, with the aforementioned components enclosed within a motor housing 212. The housing 212 may further enclose additional components of the electric motor such as a plurality of magnets, an electromagnetic coil wound around protrusions of a stator, and/or a rotational sensor (not shown for brevity). The rotor shaft 208 may have a columnar shape with a circular cross-section (e.g., along the z-axis, as further shown and described with respect to FIG. 3) and be rotatably supported about its own axis by an output-end bearing 214 and encoder-end bearing 216 provided between both ends thereof and the housing 212. The rotor shaft 208 may be comprised of a suitable material (e.g., aluminum, SAE 1045 in cold or hot rolled steel, C1045).

The lamination stack 210 may be a package of individual electromagnetic plates separated by electrically insulating layers to suppress eddy current losses under magnetic loading. For example, the lamination stack 210 may be comprised of a number of disk shaped steel plates laminated in silicone. The plates comprising the lamination stack 210 may be stacked loosely together, welded together (e.g., plasma welded, laser welded, TIG-resistance welded), or otherwise suitably bonded (e.g., via interlocking, bonding varnish). The lamination stack 210 may be tube shaped and surround a portion of the rotor shaft 208 so that two ends of the rotor shaft 208 (e.g., an output-end 230 and an encoder-end 232) are located outside of the lamination stack 210.

As shown in a cross-sectional view 203 of FIG. 2B taken across axis A1 in FIG. 2A, the rotor shaft 208 may be inserted through a central opening 260 that runs through the lamination stack 210 along the x-axis. Further, portions of the lamination stack 210 may be removed to reduce the overall weight of the rotor 206. Thus, the lamination stack 210 may further include a plurality of axial channels 262 that run horizontally (e.g., parallel to the x-axis) through the lamination stack 210 and surround the central opening 260. The plurality of axial channels 262 may be comprised of a ring of six evenly spaced apart adjacent channels. For example, the plurality of axial channels 262 may include: a first channel 264 adjacent to and spaced away from a second channel 266; a third channel 268 adjacent to and spaced away the second channel 266 and a fourth channel 270; and so on around the outer perimeter of the central opening 260. The channels comprising the plurality of axial channels 262 may be tube-shaped. As the plurality of axial channels 262 function as weight-reduction holes, the dimensions, positioning, shape, and/or number of channels comprising the plurality of axial channels 262 may vary. In some examples, the plurality of axial channels 262 may have more or less than six channels.

The lamination stack 210 may have the same axial center as the outer peripheral portion of the rotor shaft 208. The lamination stack 210 may be connected or suitably coupled to the rotor shaft 208 so that both components are integrally rotated within the motor in response to an input of electrical energy to the motor. For example, the plurality of magnets may be arranged within the housing 212 around the outer peripheral portion of the lamination stack 210. Thus, as current flowing through the electromagnetic coil is appropriately changed (e.g., via output from a coupled energy storage device such as energy storage device 114 of FIG. 1), the magnetic field generated in the protrusions of the stator will change. In turn, the change in the magnetic field of the stator will cause rotation of the lamination stack 210 and rotor shaft 208 (e.g., via the plurality of magnets) which may be output as a mechanical driving force for the vehicle.

As shown in FIG. 2A, an output-end balance plate 220 may be disposed at a first end 222 of the lamination stack 210 and an encoder-end balance plate 224 may be disposed at a second end 226 (e.g., opposite the first end 222) of the lamination stack 210. The encoder-end balance plate 224 may be substantially disk shaped and include a central aperture surrounded by a recessed region 248, as further shown and described with respect to FIGS. 3A and 3B. Similarly, the output-end balance plate 220 may include a central aperture surrounded by a recessed region 252. The output-end balance plate 220 also includes a plurality of inner pathways that connect to the recessed region 252 such as a first pathway as indicated by a series of dashed arrows 254, as further shown and described with respect to FIGS. 4A and 4B. The balance plates 220, 224 may be positioned around the rotor shaft 208 via the central apertures as further described below. Further, the balance plates 220, 224 may be fixedly attached to the ends 222, 226 of the lamination stack 210 so as to rotate integrally with the lamination stack 210 and the rotor shaft 208. The balance plates 220, 224 may function as weights for adjusting the dynamic balance of the rotor 206 when the rotor shaft 208 rotates. Specifically, a dynamic balance may be obtained by forming holes at appropriate positions on the outer peripheral surfaces of the balance plates 220, 224 to prevent vibration when the rotor shaft 208 rotates (as further shown and described with respect to FIGS. 4A and 4B).

Further, the balance plates 220, 224 may secure the lamination stack 210 within the rotor 206 via a clamping force applied by a locking nut 228. The locking nut 228 may be threaded onto the output-end 230 of the rotor shaft 208 and continually tightened until it comes into face-sharing contact with a first end 234 of the output-end balance plate 220. As the locking nut 228 is tightened, the lamination stack 210 may be clamped between the output-end balance plate 220 and the encoder-end balance plate 224 within the rotor 206. A second end 236 (e.g., opposite the first end 234) of the output-end balance plate 220 may exert lateral (e.g., parallel to x-axis) force against the first end 222 of the lamination stack 210 via tightening of the locking nut 228. The lateral force may result in the second end 226 of the lamination stack 210 being pressed against a back face 238 of the encoder-end balance plate 224. In turn, the pressing force of the lamination stack 210 against the back face 238 may cause a front face 240 (e.g., opposite the back face 238) of the encoder-end balance plate 224 to mate with a shoulder 242 of the rotor shaft 208. Thus, the encoder-end balance plate 224 may be held in a fixed position via mating of the front face 240 and the shoulder 242 so that lateral force applied by tightening of the locking nut 228 results in the lamination stack 210 being clamped between the balance plates 220, 224.

Figure 3B:
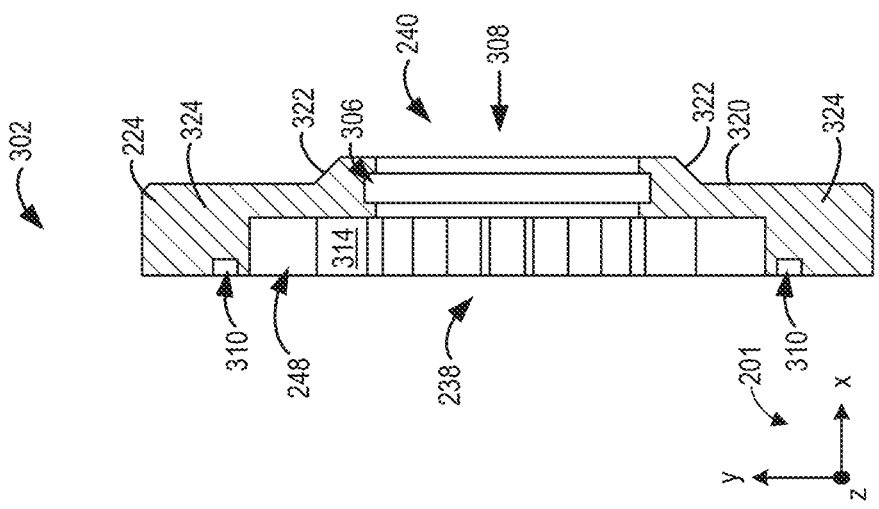
FIG. 3B is a cross-sectional view of the encoder-end balance plate of FIG. 3A.
Figure 3A:
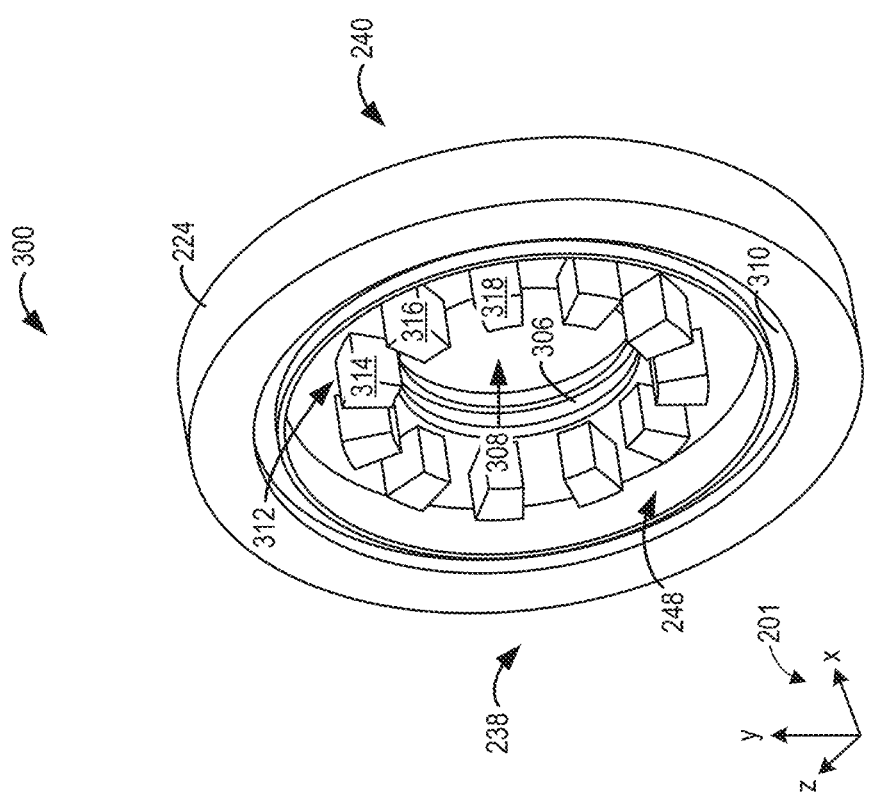
FIG. 3A is a side perspective view of an encoder-end balance plate of the cooling system.

FIGS. 3A and 3B show a side perspective view 300 and a cross-sectional view 302, respectively, of the encoder-end balance plate 224. The encoder-end balance plate 224 may substantially disk shaped and include a central aperture 308 lined by a first groove 306 that houses an O-ring (not shown) or another suitable sealing device. The central aperture 308 may be of a suitable size and dimensions (e.g., circular with a diameter just larger than the outer diameter of the rotor shaft 208) so that the rotor shaft 208 may inserted into the central aperture 308 and secured to the encoder-end balance plate 224 via face-sharing contact with the first groove 306 (e.g., the rotor shaft 208 may be press-fit into the central aperture 308 of the encoder-end balance plate 224), with the O-ring within the first groove providing a seal between the encoder-end balance plate 224 and the rotor shaft 208. The central aperture 308 may be located within the recessed region 248 of the encoder-end balance plate 224 and surrounded by a plurality of supports 312. The plurality of supports 312 may include a series of equally spaced apart substantially square supports that protrude from the back face 238 of the encoder-end balance plate 224 within the recessed region 248.

The plurality of supports 312 may include a first support 314 adjacent to and spaced apart from a second support 316, a third support 318 adjacent to and spaced apart from the second support 316, and so on around the outer diameter of the central aperture 308 (e.g., the plurality of supports 312 may surround the central aperture 308), with all of the supports being the same dimensions. The plurality of supports 312 may not extend beyond or protrude from the recessed region 248 of the encoder-end balance plate 224 (e.g., the plurality of supports 312 may not extend beyond the planar surface of the back face 238). The recessed region 248 may be ring shaped and surrounded by a second groove 310, with both the recessed region 248 and the second groove 310 concentric to the central aperture 308. Thus, when the lamination stack 210 is secured between the balance plates 220, 224 via tightening of the locking nut 228 as described above, the plurality of supports 312 may interact with the plurality of evenly spaced apart channels of the lamination stack 210. In this way, the plurality of supports 312 may ensure that the clamping force applied via the locking nut 228 is evenly distributed across the back face 238 of the encoder-end balance plate 224 and the second end 226 of the lamination stack 210. Further, similar to the first groove 306, the second groove 310 may house an O-ring that may be used to form a seal between the encoder-end balance plate 224 and the laminated stack 210 when the two components are securely connected.

As shown in FIG. 3B, the front face 240 of the encoder-end balance plate 224 includes a first flat (e.g., parallel with the y-axis) portion 320 that surrounds and includes the central aperture 308. The first flat portion 320 may mate with the shoulder 242 of the rotor shaft 208 as previously described. An angled edge 322 may connect the first flat portion 320 to a second flat portion 324 of the front face 240 of the encoder-end balance plate 224. In addition to holes formed within the balance plates 220, 224, the material comprising the angled edge 322 and the second flat portion 324 of the encoder-end balance plate 224 may be removed as desired to adjust the dynamic balance of the rotor 206. For example, the angled edge 322 may be made straight (e.g., parallel to the x-axis) and/or the thickness (e.g., with respect to the x-axis) of the second flat portion 324 may be decreased via material removal. Material may also be removed from the outermost section of the second flat portion 324 by drilling or another suitable technique to dynamically balance the rotor 206.

FIGS. 4A and 4B show a side perspective view 400 and a cross-sectional view 402, respectively, of the output-end balance plate 220. The output-end balance plate 220 may be T-shaped and include a disk shaped top portion 404 connected to a tubular shaft 406. A central aperture 408 may run through the length (e.g., parallel to the x-axis) of the top portion 404 and the tubular shaft 406. The central aperture 408 may be of a suitable size and dimensions (e.g., circular with a diameter just larger than the outer diameter of the rotor shaft 208) so that the rotor shaft 208 may inserted into the central aperture 408. As previously described, the rotor shaft 208 may be supported within the rotor 206 by the bearings 214, 216. The output-end bearing 214 may be supported by the output-end balance plate 220 at the output-end 230 of the rotor shaft 208. For example, the output-end bearing 214 may surround a portion of the tubular shaft 406 adjacent to the top portion 404 of the output-end balance plate 220, with the output-end 230 of the rotor shaft 208 being partially housed within the tubular shaft 406 and the top portion 404. Thus, the outer diameter of the tubular shaft 406 may be of suitable dimensions where output-end bearing 214 may be slid onto the tubular shaft 406 and the two components functionally coupled.

The top portion 404 may include the recessed region 252 that surrounds a ring shaped supporting face 412, with the central aperture 408 passing through the center opening of the supporting face 412. The supporting face 412, the recessed region 252, and a first groove 422 that surrounds the recessed region 252 may all be concentric to the central aperture 408. Similar to the plurality of supports 312 of the encoder-end balance plate 224, the supporting face 412 may evenly distribute the clamping force applied via the locking nut 228 across the second end 236 of the output-end balance plate 220 and the first end 222 of the lamination stack 210. Further, the size and dimensions of the first groove 422 may be suitable for insertion of an O-ring. Thus, the first groove 422 may seal the output-end balance plate 220 against the lamination stack 210 via the inserted O-ring when the lamination stack 210 is clamped between the balance plates 220, 224.

The top portion 404 also includes a region of additional material 430 that surrounds the outer diameter of the first groove 422, with the region of additional material 430 being ring shaped and concentric to the central aperture 408. The region of additional material 430 may define the outer perimeter of the top portion 404 of the output-end balance plate 220. The region of additional material 430 or portions thereof may be removed as desired to adjust/enhance the dynamic balance of the rotor 206.

The output-end balance plate 220 further includes a plurality of holes 414 that pass through (e.g., along the x-axis) the supporting face 412 and continue into a shell 428 comprising the tubular shaft 406 as shown in FIG. 4B. The plurality of holes 414 may be a series of evenly spaced apart adjacent holes that are drilled or otherwise suitably cut into the output-end balance plate 220. For example, the plurality of holes 414 may include a first hole 416 that is adjacent to and spaced apart from a second hole 418, a third hole 420 that is adjacent to and spaced apart from the second hole 418, and so on around a top surface 421 of the supporting face 412.

Each hole of the plurality of holes 414 may be identical in shape and dimensions, with the shape and dimensions suitable so that the holes may traverse the supporting face 412 and extend into a portion of tubular shaft 406 along the x-axis. For example, the first hole 416 may fully traverse the supporting face 412 and terminate within the tubular shaft 406 before coming into contact with the first end 234 of the output-end balance plate 220. The plurality of holes 414 may terminate at or just beyond a second groove 426 that surrounds the outer diameter of the tubular shaft 406. The second groove 426 may partially extend through and terminate within each hole of the plurality of holes 414. For example, the second groove 426 may terminate halfway through the width (e.g., along the y-axis) of each hole of the plurality of holes 414.

A side surface 423 of the supporting face 412 may further include a third groove 424. The third groove 424 may surround the outer diameter of the supporting face 412 and partially traverse each hole of the plurality of holes 414 along the y-axis as shown in FIG. 4B. For example, the third groove 424 may extend through the side surface 423 and terminate at a midpoint within each of hole of the plurality of holes 414. Thus, pathways that connect to the recessed region 252 and extend through the output-end balance plate 220 are formed via coupled openings of the second groove 426, the third groove 424, and the plurality of holes 414. Two pathways are illustrated in FIG. 4B the first pathway is indicated by the dashed arrows 254 (as also shown in FIG. 2A) and a second pathway is indicated by a series of dashed arrows 432. For example, the first pathway indicated by the dashed arrows 254 may begin within the recessed region 252, go through the side surface 423 of the supporting face 412 and into the first hole 416 via the third groove 424. The first pathway may then follow the length (e.g., along the x-axis) of the first hole 416 and end outside the shell 428 of the tubular shaft 406 at the second groove 426. Thus, the output-end balance plate 220 may have multiple pathways, with one formed at each hole of the plurality of holes 414. The configurations of the output-end balance plate 220 and the encoder-end balance plate 224 may be used to provide uniform cooling the motor as further described below.

Returning now to FIG. 2A, when the output-end balance plate 220 and encoder-end balance plate 224 are clamped to the lamination stack 210 (e.g., via the lateral force applied by tightening the locking nut 228), the pathways within the output-end balance plate 220 may align with and connect to the plurality of axial channels 262 within the lamination stack 210 via the recessed region 252. Further, the plurality of axial channels 262 within the lamination stack 210 may align with and connect to the recessed region 248 of the encoder-end balance plate 224. Moreover, the recessed region 248 of the encoder-end balance plate 224 may connect to the hollow portion of the rotor shaft 208 via a plurality of holes 256 that perpendicularly traverse a shell 258 comprising the rotor shaft 208. The plurality of holes 256 may be located within the portion of the rotor shaft 208 that is housed within the encoder-end balance plate 224. Thus, a continuous pathway in which an oil or liquid coolant may flow through the rotor 206 is formed between the balance plates 220, 224, the lamination stack 210, and the rotor shaft 208.

For example, during motor use, a transmission oil pump 244 may pump an oil supply from the output-end 230 through the center of the rotating rotor shaft 208 toward the encoder-end 232. In some examples, the oil supply may come from a reservoir within the transmission. In some examples, the oil supply may come from any suitable source such as the engine oil gallery. In some examples, the oil supply may be pumped into the rotor shaft 208 by another pump. The oil may then flow from the encoder-end 232 of the rotor shaft 208 into the recessed region 248 of the encoder-end balance plate 224 via the plurality of holes 256, with the encoder-end balance plate 224 serving to control the oil as it flows radially outward from the center of the rotor shaft 208. The oil contained within the recessed region 248 of the encoder-end balance plate 224 may then flow into the plurality of axial channels 262 of the lamination stack 210 and back toward the output-end 230 of the rotor shaft 208 (e.g., the flow of the oil may be diverted 180 degrees from the direction it was pumped). The oil may then flow from the plurality of axial channels 262 into the recessed region 252 of the output-end balance plate 220. The oil may then flow from the recessed region 252 through the third groove 424 of the output-end balance plate 220 and into the plurality of holes 414 where it may exit via the second groove 426 of the tubular shaft 406. The exiting oil may flow into the transmission oil pump 244 where it may then be pumped back into the encoder-end 232 of the rotor shaft 208. An example of this pathway through the fourth channel 270 of the lamination stack 210 is indicated by a series of arrows 245.

Thus, the oil may continually and uniformly flow through rotor 206 when the motor is in use. As the oil is circulated through the rotor 206, generated heat may be transferred to the oil thereby cooling the motor. Further, by passing the oil through the plurality of axial channels 262, overall resistance between the oil and the lamination stack 210 may be reduced thereby increasing the effectiveness of cooling provided by the oil. Thus, uniform cooling may be provided by the cooling system 202 without adding excessive weight to the motor. In some embodiments, the inner surface of plurality of axial channels 262 may be lined with a liner (e.g., a dielectric liner) so that another type of liquid coolant (e.g., water) may be employed by the cooling system 202. In some embodiments, a passive catch system rather than the transmission oil pump 244 may be used to maintain the continuous flow of the oil through the rotor 206.

FIG. 5 is a flowchart illustrating a method 500 for cooling laminations of a rotor of an electric motor according to the embodiments of the present disclosure. Method 500 is described with respect to the system and components described above with respect to FIGS. 1-4B but could also be carried out with other systems/components (e.g., an electric motor of an electric vehicle, electric motors of machines) without departing from the scope of this disclosure. Method 500 may be carried out according to instructions stored in non-transitory memory of a computing device such as a central processing unit (CPU) or control system (e.g., control system 122 of FIG. 1) of a vehicle.

At 502, method 500 may include feeding oil through the center of a rotating rotor shaft of the electric motor via a pump or passive catch system. The pump or passive catch system may be within a transmission (e.g., transmission oil pump 244 of FIG. 2B) to which the rotor shaft is functionally coupled. The oil may be fed from the transmission into a first end of the hollow rotor shaft where the oil flows toward a second end of the rotor shaft. At 504, the oil may flow outward from the rotor shaft (e.g., via centrifugal force or pumping). The rotor shaft may be comprised of a shell that includes one or more passages adjacent to the second end of the rotor shaft. As the rotor shaft rotates, oil within the rotor shaft may flow out of the passages via centrifugal force. For example, the rotor shaft may include a plurality of perpendicular holes (e.g., plurality of holes 256 of FIG. 2A) that are adjacent to the second end and encompass the outer circumference of the rotor shaft.

At 506, the outward flowing oil may be directed toward axial holes within the rotor. The outward flowing oil may be directed toward the axial holes of the rotor via a balance plate (e.g., encoder-end balance plate 224 of FIGS. 2A, 3A, and 3B) integrally coupled to the second end of the rotor shaft, with the balance plate encompassing the region containing the passages within the shell, and a lamination stack. For example, the balance plate may be substantially disk shaped and include a central aperture lined with an O-ring. The balance plate may further include at least one recessed region within a back face, with an O-ring lined groove surrounding the recessed region. The rotor shaft may be inserted into the central aperture at the back face, with a seal being formed between the rotor shaft and the balance plate via the O-ring. Coupling of the rotor shaft to the balance plate may further secure the back face of the balance plate to the lamination stack (e.g., the back face of the balance plate and a first end of the lamination stack may be in face-sharing contact), with the O-ring lined groove surrounding the recessed region forming a seal between the lamination stack and the balance plate. The lamination stack may include a plurality of axial holes that may be used for weight reduction of the rotor. The axial holes may align and connect with the recessed region of the balance plate. Thus, as the oil flows outward from the passages within the shell of the rotor shaft, the oil may be collected within the recessed region of the balance plate where it is directed into the axial holes of the lamination stack via centrifugal force of the rotor (e.g., the axial holes are the only connected openings to the recessed region that may allow for the passive flow of the oil via centrifugal force as the oil is being actively pumped from the connected rotor shaft).

At 508, the oil may flow through the axial holes of the rotor. As the rotor continues to rotate, the oil that has flowed from the recessed region of the balance plate into the lamination stack may flow back toward the first end of the rotor shaft and the transmission. At 510, the oil may be directed from the axial rotor holes to the pump or passive catch system. The oil may flow outward from the axial holes of the lamination stack and into a second balance plate. The second balance plate may be integrally coupled to the lamination stack and include a recessed region.

The recessed region of the second balance plate may be connected to a series of holes that traverse the majority of the length of the balance plate and terminate within a connected groove. When the lamination stack is coupled to the second balance plate, the axial holes may connect with the recessed region so that oil may flow from the axial holes into the recessed region (e.g., transported by the positive pressure gradient resulting from the encoder-end balance plate, the outlet is radially outward with respect to the inlet). Oil within the recessed region may then be directed into the series of holes within the second balance plate and toward the groove. Oil within the groove may then be directed out of the balance plate and into the transmission via centrifugal force. After which, if the motor is still in use, method 500 may return to 502. If the motor is no longer in use (e.g., the rotor is no longer being rotated), method 500 may end.

FIGS. 1-4B are shown approximately to scale, however other relative dimensions may be used.

FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, uniform cooling of laminations of a rotor of an electric motor may be achieved using oil. The oil may be pumped by a transmission oil pump through a rotor shaft as the rotor shaft rotates where the oil is subsequently diverted to the axial holes of the rotor via a first balance plate and centrifugal force. The oil may then flow through the rotor in a direction opposite to which it was pumped. The oil is brought into direct contact with the surface of the rotor laminations, thereby increasing contact area and reducing overall thermal resistance and uniformly cooling the rotor. The oil is then passed through a second balance plate where it is diverted back to the transmission and may be pumped back into the rotor shaft for continuous cooling of the motor.

The cooling system may include an oil supply, with the oil supply configured to flow oil through a closed-loop pathway, the closed-loop pathway only including an interior passageway of the rotor shaft, one or more passages and/or recesses of the encoder-end balance plate, one or more weight-reduction channels of the lamination stack, and one or more passages and/or recesses of the output-end balance plate. The oil supply may only flow oil to the interior passageway, the interior passageway may only flow the oil to the one or more passages and/or recesses of the encoder-end balance plate, the one or more passages and/or recesses of the encoder-end balance plate may only flow the oil to the one or more weight-reduction channels of the lamination stack, the one or more weight-reduction channels of the lamination stack may only flow the oil to the one or more passages and/or recesses of the output-end balance plate, and the one or more passages and/or recesses of the output-end balance plate may only flow the oil to back to the oil supply. No other passages or channels may come into the closed-loop pathway. The closed-loop pathway may only receive oil from the oil supply. In some embodiments, the cooling system may include a coolant supply, with the coolant supply configured to flow coolant through the closed-loop pathway as described above. The closed-loop pathway may only receive coolant from the coolant supply.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for cooling an electric motor, comprising:
    feeding coolant through a center of a rotating rotor shaft from a first end of a rotor towards a second end of the rotor;
    flowing coolant outward from the rotor shaft on the second end of the rotor;
    directing the outward flowing coolant toward axial holes in the rotor;
    flowing coolant through the axial holes toward the first end of the rotor; and
    directing coolant from the axial holes into an output-end balance plate on the first end of the rotor, the coolant flowing through the output-end balance plate radially inwardly, then longitudinally with the rotor shaft, and then exiting the output-end balance plate external to a housing of the electric motor.

2. The method of claim 1, wherein the coolant is fed through the rotor shaft via a pump or a passive catch system and the coolant flows out of the rotor shaft via one or more lateral holes in the rotor shaft.

3. The method of claim 2, wherein the coolant flowing through the one or more lateral holes in the rotor shaft is collected within a recessed region of an encoder-end balance plate on the first end of the rotor shaft, and wherein the recessed region is coupled to the lateral holes of the rotor shaft and the axial holes of the rotor, the coolant within the recessed region flowing to the axial holes of the rotor.

4. The method of claim 1, wherein the coolant flowing through the axial holes of the rotor flows into a recessed region of the output-end balance plate coupled to the rotor on the second end of the rotor, and the coolant within the recessed region flows into a pump or a passive catch system via one or more pathways within the output-end balance plate, the one or more pathways coupled to the recessed region and the pump or the passive catch system.

5. The method of claim 1, wherein a water glycol solution is used as the coolant and passed through the axial holes, an inner surface of the axial holes lined with a dielectric liner.

6. The method of claim 1, wherein the electric motor includes:
    an encoder-end balance plate including a central aperture that is surrounded by a recessed region, and a plurality of supports extending from an internal face of the encoder-end balance plate through the recessed region and into contact with an end of a lamination stack of the rotor; and
    the output-end balance plate including a central aperture, a recessed region, grooves, and a plurality of holes.

7. The method of claim 6, wherein the plurality of supports are symmetrically arranged about a central aperture of the encoder-end balance plate.

8. The method of claim 1, wherein the steps of feeding, flowing, directing, flowing, and directing the coolant occur in a closed-loop oil pathway that comprises:
    a hollow portion of the rotor shaft in which coolant is flowed from an output end of the rotor shaft towards an encoder end of the rotor shaft;
    the axial holes in the rotor shaft which are adjacent to the encoder end and fluidly connected to a plurality of inner pathways in an encoder-end balance plate; and
    a plurality of axial channels in a lamination stack of the rotor that are fluidly connected to a recessed region of the encoder-end balance plate.

9. The method of claim 8, wherein the electric motor further comprises an output-end bearing in contact with the output-end balancing plate.

10. The method of claim 8, wherein the plurality of axial channels in the lamination stack are positioned radially inward from stator end windings.

11. The method of claim 8, wherein the plurality of inner pathways are positioned radially inward from an output-end bearing.

12. The method of claim 1, further comprising feeding the coolant to the center of the rotor shaft from a pump.

13. The method of claim 12, wherein the pump is a transmission pump.

14. The method of claim 1, wherein directing the coolant from the axial holes includes directing the coolant from the axial holes to a pump or a passive catch system.

15. The method of claim 1, wherein the coolant is oil.

16. The method of claim 6, wherein the output-end balance plate comprises a supporting face which extends through the recessed region and contacts an opposite end of the lamination stack.

17. The method of claim 6, wherein the coolant flows longitudinally with the rotor shaft through a tubular shaft of the output-end balance plate, and
   wherein the rotor shaft is positioned within the tubular shaft and the tubular shaft is positioned within an output-end bearing.

18. The method of claim 6, wherein the plurality of supports are evenly spaced around the central aperture of the encoder-end balance plate and distribute a clamping force applied by a locking nut clamping the lamination stack between the output-end balance plate and the encoder-end balance plate.

19. The method of claim 18, wherein coolant flows between the plurality of supports.

* * * * *